(12) United States Patent
Matsuda et al.

(10) Patent No.: US 6,507,168 B1
(45) Date of Patent: Jan. 14, 2003

(54) UNINTERRUPTIBLE POWER SUPPLY

(75) Inventors: Kensaku Matsuda, Tokyo (JP);
Manabu Yamamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 415 days.

(21) Appl. No.: 10/048,928

(22) PCT Filed: Jun. 6, 2000

(86) PCT No.: PCT/JP00/03653
§ 371 (c)(1),
(2), (4) Date: Feb. 5, 2002

(87) PCT Pub. No.: WO01/95457
PCT Pub. Date: Dec. 13, 2001

(51) Int. Cl.[7] ............................................... H01M 10/76
(52) U.S. Cl. ....................................................... 320/103
(58) Field of Search ................................ 320/103, 116, 320/127, 135, 107, 114

(56) References Cited

U.S. PATENT DOCUMENTS 5,835,989 A * 11/1998 Nagai

FOREIGN PATENT DOCUMENTS

| EP | 0 434 905 A2 | * | 7/1991 |
| JP | 4-25917 | * | 1/1992 |
| JP | 7-87685 | | 3/1995 |
| JP | 7-200108 | * | 8/1995 |
| JP | 7-327329 | | 12/1995 |
| JP | 08336242 A | * | 12/1996 |
| JP | 10-23619 | | 1/1998 |

OTHER PUBLICATIONS

Concise Statement of Relevance for Foreign language documents, No Date.

* cited by examiner

Primary Examiner—Edward H. Tso
(74) Attorney, Agent, or Firm—Sughrue Mion, PLLC

(57) ABSTRACT

A battery of an uninterruptible power supply unit 1a is configured by at least two batteries (a first battery 2 and a second battery 21a). A control circuit 12a judges opened/closed states of a first cover 6a and a second cover 25a on the basis of information from a first cover-opening detecting device 7a and a second cover-opening detecting device 11a. When the first cover 6a is opened, a first switch 8 which connects a charge and discharge circuit 3 to the first battery 2 is opened, and, when the second cover 25a is opened, a second switch 10 which connects the charge and discharge circuit 3 to the second battery 21a is opened.

4 Claims, 5 Drawing Sheets

UNINTERRUPTIBLE POWER SUPPLY

TECHNICAL FIELD

The present invention relates to an uninterruptible power supply unit which has a battery, and which normally supplies an electric power of an AC power source to a backed-up apparatus, and, when the AC power source is interrupted, supplies an electric power from the battery to the backed-up apparatus.

BACKGROUND ART

FIG. 4 is a view showing the configuration of a conventional uninterruptible power supply unit. In the figure, 40 denotes an AC power source, 41a denotes an uninterruptible power supply unit, and 42 denotes a backed-up apparatus such as a computer system which, when the AC power source 40 is interrupted, is to be backed up by the uninterruptible power supply unit 41a. Furthermore, 50 denotes a battery which is incorporated in the uninterruptible power supply unit 41a, 51 denotes a charge and discharge circuit which, when the AC power source 40 is in the normal state, causes the battery 50 to be charged by the AC power source 40, and which, when the AC power source 40 is in an abnormal state such as power interruption or momentary power interruption, causes the battery 50 to be discharged, thereby supplying an electric power to the backed-up apparatus 42, and 52 denotes a connector trough which the battery 50 and the charge and discharge circuit 51 are connected to each other. Furthermore, 53a denotes a case of the uninterruptible power supply unit 41a housing the battery 50, 54 denotes an opening which is used for replacement of the battery 50, 55a denotes a cover for closing the opening 54, 56 denotes a cover-opening detecting device which detects an opened/closed state of the cover 55a by using an optical switch or the like, and 57 denotes a charge and discharge circuit disconnecting switch which disconnects the charge and discharge circuit 52 from the AC power source 40.

When the AC power source 40 is normal, the uninterruptible power supply unit 41a supplies an electric power from the AC power source 40 to the backed-up apparatus 42, and closes the charge and discharge circuit disconnecting switch 57 to connect the AC power source 40 to the charge and discharge circuit 51 to charge the battery 50. When the AC power source 40 is in an abnormal state such as power interruption or momentary power interruption, the uninterruptible power supply unit 41a serves as a backup power source to discharge the battery 50 to supply an electric power to the backed-up apparatus 42. The battery 50 is repeatedly rechargable, but its power suppliable time is shortened as a result of aging. Therefore, the battery is usually replaced with a fresh one at two- or three-year intervals.

The uninterruptible power supply unit 41a detects the opened/closed state of the cover 55a by means of the cover-opening detecting device 56. When the cover 55a is opened, the unit judges that replacement of the battery 50 is to be performed, and then opens the charge and discharge circuit disconnecting switch 57 to disconnect the charge and discharge circuit 51 from the AC power source 40. As a result, it is possible to prevent replacement of the battery 50 from being performed during a charging process in which a charging current flows through the battery 50.

FIG. 5 is a view showing the configuration of a conventional uninterruptible power supply unit. A battery which is to be separately placed is additionally disposed. In the figure, 40, 42, 50 to 52, 54, and 57 denote the identical components as those of FIG. 4, and their description is omitted. Furthermore, 41b denotes an uninterruptible power supply unit, 53b denotes a case of the uninterruptible power supply unit 41b housing the battery 50, 55b denotes a cover for closing the opening 54, 58 denotes a battery replacement instruction switch which closes and opens the charge and discharge circuit disconnecting switch 57, 60 denotes a battery unit which is placed separately from the uninterruptible power supply unit 41b, 61 denotes an auxiliary battery which is incorporated in the battery unit 60, and which is connected in parallel to the battery 50, and 62 denotes a connector to which the auxiliary battery 61 is connected.

The uninterruptible power supply unit 41a of FIG. 4 is an example in which only the battery 50 incorporated in the uninterruptible power supply unit 41a is used as a battery. The uninterruptible power supply unit 41b of FIG. 5 is an example in which, in order to prolong the backup time, the battery unit 60 in which the auxiliary battery 61 is incorporated is additionally disposed so that a battery is configured by the battery 50 and the auxiliary battery 61.

When the AC power source 40 is normal, the uninterruptible power supply unit 41b supplies an electric power from the AC power source 40 to the backed-up apparatus 42, and closes the charge and discharge circuit disconnecting switch 57 to connect the AC power source 40 to the charge and discharge circuit 51 to charge the batteries (the battery 50 and the auxiliary battery 61). When the AC power source 40 is in an abnormal state such as power interruption or momentary power interruption, the uninterruptible power supply unit 41b serves as a backup power source to discharge the batteries (the battery 50 and the auxiliary battery 61) to supply an electric power to the backed-up apparatus 42.

In replacement of the batteries (the battery 50 and the auxiliary battery 61) in the uninterruptible power supply unit 41b, when the battery 50 incorporated in the uninterruptible power supply unit 41b is to be replaced, the cover 55b is opened. By contrast, when the auxiliary battery 61 incorporated in the battery unit 60 which is placed separately from the uninterruptible power supply unit 41b is to be replaced, the cover 55b is not opened. Therefore, the battery replacement instruction switch 58 is disposed so that, when the batteries (the battery 50 and the auxiliary battery 61) are to be replaced, the battery replacement instruction switch 58 is operated. When the battery replacement instruction switch 58 is operated, it is judged that instructions for the battery replacement has been given, and the charge and discharge circuit disconnecting switch 57 is then opened to disconnect the charge and discharge circuit 51 from the AC power source 40.

In replacement of the battery of the uninterruptible power supply unit, as described above, the charge and discharge circuit disconnecting switch 57 is opened in response to an operation of the cover-opening detecting device 56 or the battery replacement instruction switch 58, so that the battery replacement is prevented from being performed during a charging process. However, there is a problem in that, when power interruption or momentary power interruption occurs during a process of replacing the battery, it is impossible to exert the original function of an uninterruptible power supply unit that, in the case of power interruption, the unit supplies an electric power to a backed-up apparatus.

The invention has been conducted in order to solve the above-discussed problem. It is an object of the invention to obtain an uninterruptible power supply unit which, even when power interruption or momentary power interruption occurs during a process of replacing a battery, can supply an electric power to a backed-up apparatus.

DISCLOSURE OF THE INVENTION

The uninterruptible power supply unit of the invention is an uninterruptible power supply unit which has a battery and a charge and discharge circuit, and in which, when an AC power source is in a normal state, the AC power source is used as a power source to supply an electric power to a backed-up apparatus, and the battery is charged by the charge and discharge circuit, and, when the AC power source is in an abnormal state such as power interruption, the battery is discharged by the charge and discharge circuit to supply an electric power to the backed-up apparatus, wherein the battery is configured by a first battery and a second battery, the unit comprises: a first switch which connects the charge and discharge circuit to the first battery; a second switch which connects the charge and discharge circuit to the second battery; a first cover which is opened when the first battery is to be replaced; a second cover which is opened when the second battery is to be replaced; a first cover-opening detecting device which detects an opened state of the first cover; a second cover-opening detecting device which detects an opened state of the second cover; and a control circuit which controls opening/closing of the first switch and the second switch in accordance with opened/closed states of the first cover and the second cover, when the first cover is opened, the first switch is opened to enable replacement of the first battery, and, when the second cover is opened, the second switch is opened to enable replacement of the second battery.

Furthermore, the second battery, the second cover, the second cover-opening detecting device, and the second switch constitute a battery unit which can be disposed separately from the uninterruptible power supply unit, and which is connected to the charge and discharge circuit through a connector.

Moreover, the uninterruptible power supply unit has at least one of a display device and an alarm device, and, when the first cover or the second cover is opened, the control circuit gives an alarm for an opened state of the cover.

Furthermore, the first cover or the second cover comprises interlocking means, and the control circuit interlocks the second cover when the first cover is opened, and interlocks the first cover when the second cover is opened.

BEST MODE FOR CARRYING OUT THE INVENTION

Embodiment 1

Figure 1:
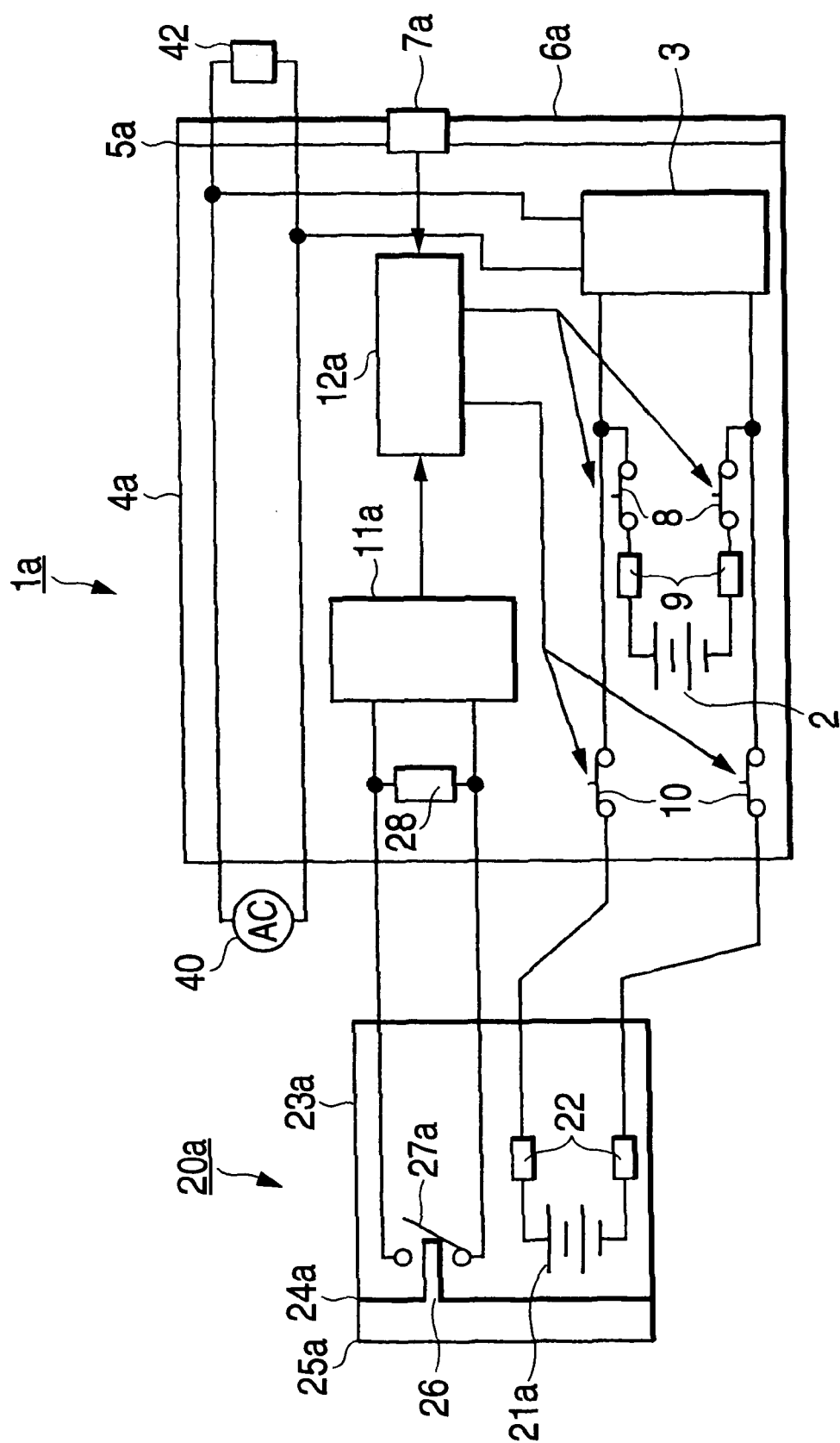
FIG. 1 is a view showing the configuration of an uninterruptible power supply unit of Embodiment 1 of the invention which comprises a first battery and a second battery.

FIG. 1 is a view showing the configuration of an uninterruptible power supply unit of Embodiment 1 of the invention which comprises a first battery and a second battery. In the figure, 1a denotes the uninterruptible power supply unit, 2 denotes the first battery, and 3 denotes a charge and discharge circuit which, when an AC power source 40 is in the normal state, causes the first battery 2 and a second battery 21a that will be described later to be charged by the AC power source 40, and which, when the AC power source 40 is in an abnormal state such as power interruption or momentary power interruption, causes the first battery 2 and the second battery 21a that will be described later to be discharged, thereby supplying an electric power to a backed-up apparatus 42. Furthermore, 4a denotes a case of the uninterruptible power supply unit 41a which houses the first battery 2, 5a denotes an opening of the case 4a which is used for replacement of the first battery 2, 6a denotes a first cover for closing the opening 5a, 7a denotes a first cover-opening detecting device which detects an opened/closed state of the first cover 6a, 8 denotes a first switch which closes and opens the connection between the charge and discharge circuit 3 and the first battery 2, 9 denotes a first connector trough which the first battery 2 and the first switch 8 are connected to each other, 10 denotes a second switch which closes and opens the connection between the charge and discharge circuit 3 and the second battery 21a that will be described later, 11a denotes a second cover-opening detecting device which detects an opened/closed state of a second cover 25a that will be described later, and 12a denotes a control circuit which controls opening/closing of the first switch 8 and the second switch 10 in accordance with the opened/closed states of the first cover 6a and the second cover 25a.

Furthermore, 20a denotes a battery unit which is disposed outside the uninterruptible power supply unit 1a, 21a denotes the second battery which is incorporated in the battery unit 20a, and 22 denotes a second connector for connecting the second battery 21a. Furthermore, 23a denotes a case which houses the second battery 21a, 24a denotes an opening of the case 23a which is used for replacement of the second battery 21a, 25a denotes a second cover for closing the opening 24a, and 26 denotes an operation piece which is disposed on the second cover 25a. Furthermore, 27a denotes a second cover open/close switch which is closed or opened by the operation piece 26 when the second cover 25a is opened or closed, and 28 denotes a second cover opened/closed state detection resistor which is connected in parallel to the second cover open/close switch 27a.

When the second cover 25a of the battery unit 20a is opened, the operation piece 26 which has caused the second cover open/close switch 27a to be opened is disengaged from the switch to close the second cover open/close switch 27a. The second cover-opening detecting device 11a detects the value of the second cover opened/closed state detection resistor 28 which is connected in parallel to the second cover open/close switch 27a, and, when the second cover open/close switch 27a is closed and a resistance of 0 Ω is detected as a result of formation of a closed circuit of the switch and the second cover opened/closed state detection resistor 28, judges that the second cover 25a of the battery unit 20a is opened.

From information given from the first cover-opening detecting device 7a and the second cover-opening detecting device 11a, the control circuit 12a judges the opened/closed states of the first cover 6a and the second cover 25a, so that, when the first cover 6a is opened, the circuit opens the first switch 8 which connects the charge and discharge circuit 3 to the first battery 2, and, when the second switch 25a is opened, opens the second switch 10 which connects the charge and discharge circuit 3 to the second battery 21a.

When the AC power source 40 is normal, the uninterruptible power supply unit 1a supplies an electric power to the backed-up apparatus 42, and closes the first switch 8 which connects the charge and discharge circuit 3 to the first battery 2, and the second switch 10 which connects the charge and discharge circuit 3 to the second battery 21a, so that the batteries (the first battery 2 and the second battery 21a) are charged by the charge and discharge circuit 3. When the AC power source 40 is in an abnormal state such as power interruption or momentary power interruption, the uninterruptible power supply unit 1a serves as a backup power source to discharge the batteries (the first battery 2 and the second battery 21a), thereby supplying an electric power to the backed-up apparatus 42.

When the first cover 6a is opened, the control circuit 12a opens the first switch 8 which connects the charge and discharge circuit 3 to the first battery 2, to enable replacement of the first battery 2. In this case, the second switch 10 which connects the charge and discharge circuit 3 to the second battery 21a is closed, and hence the unit is effective as a backup power source. When the second cover 25a is opened, the control circuit 12a opens the second switch 10 which connects the charge and discharge circuit 3 to the second battery 21a, to enable replacement of the second battery 21a. In this case, the first switch 8 which connects the charge and discharge circuit 3 to the first battery 2 is closed, and hence the unit is effective as a backup power source.

As described above, in Embodiment 1, the battery of the uninterruptible power supply unit is configured by at least two batteries, and a battery which is to be replaced is individually isolated. Therefore, replacement of the battery can be safely performed, and, even when power interruption or momentary power interruption occurs during a process of replacing the battery, the uninterruptible power supply unit can serve as a backup power source to supply an electric power to a backed-up apparatus.

Embodiment 2

Figure 2:
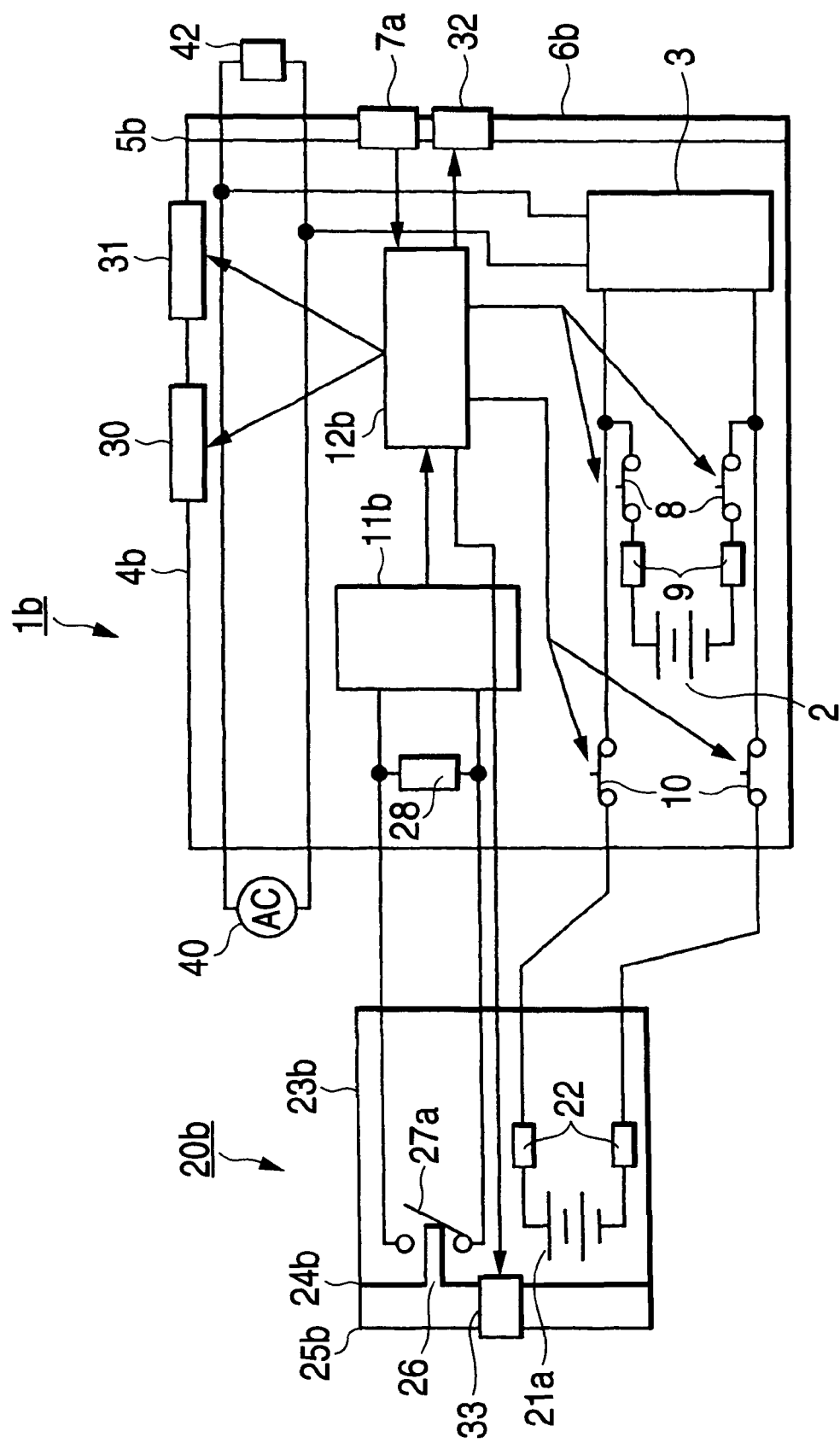
FIG. 2 is a view showing the configuration of an uninterruptible power supply unit of Embodiment 2 of the invention which comprises: a display device that displays an error message indicative of a cover opened state; an alarm outputting section that gives an alarm for the cover opened state; and interlocking means for, when one cover is opened, interlocking another cover.

FIG. 2 is a view showing the configuration of an uninterruptible power supply unit of Embodiment 2 of the invention which comprises: a display device that displays an error message indicative of a cover opened state; an alarm outputting section that gives an alarm for the cover opened state; and interlocking means for, when one cover is opened, interlocking another cover. In the figure, 2, 3, 7a, 8 to 10, 21a, 22, 26, 27a, 28, 40, and 42 denote the identical components as those of FIG. 1, and their description is omitted. Furthermore, 1b denotes the uninterruptible power supply unit, 4b denotes a case of the uninterruptible power supply unit 1b which houses the first battery 2, 5b denotes an opening which is used for replacement of the first battery 2, 6b denotes a cover for closing the opening 5b, 11b denotes a second cover-opening detecting device which detects an opened/closed state of the second cover 25b that will be described later, and 12b denotes a control circuit which, in accordance with the opened/closed states of the first cover 6b and the second cover 25b, controls opening/closing of the first switch 8 which connects the charge and discharge circuit 3 to the first battery 2, and that of the second switch 10 which connects the charge and discharge circuit 3 to the second battery 21a.

Furthermore, 20b denotes a battery unit which is disposed outside the uninterruptible power supply unit 1b, 23b denotes a case which houses the second battery 21a, 24b denotes an opening which is used for replacement of the second battery 21a, and 25b denotes a second cover for closing the opening 24b.

Furthermore, 30 denotes the display device which, when the first cover 6b or the second cover 25b is opened, displays an error message indicative of a cover opened state, and 31 denotes the alarm outputting section which, when the first cover 6b or the second cover 25b is opened, gives an alarm for the cover opened state. Furthermore, 32 denotes a first cover interlocking section which interlocks the opening 5b and the first cover 6b of the uninterruptible power supply unit 1b, and 33 denotes a second cover interlocking section which interlocks the second opening 24b and the second cover 25b.

When the first cover 6b is opened, the control circuit 12b opens the first switch 8 which connects the charge and discharge circuit 3 to the first battery 2, to enable replacement of the first battery 2, and gives an output indicative of a cover opened state to the display device 30 and the alarm outputting section 31. In this case, the second switch 10 which connects the charge and discharge circuit 3 to the second battery 21a is closed, and hence the unit is effective as a backup power source. When the first cover 6b is opened, the second cover 25b is interlocked by the second interlocking section 33. When the second cover 25b is opened, the control circuit 12b opens the second switch 10 which connects the charge and discharge circuit 3 to the second battery 21a, to enable replacement of the second battery 21a, and gives an output indicative of a cover opened state to the display device 20 and the alarm outputting section 21a. In this case, the first switch 8 which connects the charge and discharge circuit 3 to the first battery 2 is closed, and hence the unit is effective as a backup power source. When the second cover 25b is opened, the first cover 6b is interlocked by the second interlocking section 32.

As described above, in Embodiment 2, when the cover 6b of the uninterruptible power supply unit 1b in which the first battery 2 is incorporated is opened, the second cover 25b of the battery unit 20b in which the second battery 21a is incorporated is interlocked, and, when the second cover 25b of the battery unit 20b in which the second battery 21a is incorporated is opened, the cover 6b of the uninterruptible power supply unit 1b in which the first battery 2 is incorporated is interlocked. Therefore, the battery replacement can be performed in a state where one of the batteries (the first battery 2 and the second battery 21a) of the uninterruptible power supply unit is surely connected. Even when a power source failure such as power interruption or momentary power interruption occurs during a process of replacing the battery, therefore, the unit can serve as a backup source to supply an electric power to the backed-up apparatus.

When the cover 6b of the uninterruptible power supply unit 1b or the second cover 25b of the battery unit 20b is opened, the display device 30 displays an error message indicative of the cover opened state, and the alarm outputting section 31 produces an alarm output of the cover opened state. Therefore, the operator can know that one of the batteries (the first battery 2 and the second battery 21a) is insulated and the power suppliable time is shortened.

In FIG. 2 described above, the example which comprises the unit comprises both the display device 30 that displays an error message indicative of a cover opened state, and the alarm outputting section 31 that gives an alarm for the cover opened state has been described. Alternatively, the unit may comprise only one of the device and the section.

Embodiment 3

Figure 3:
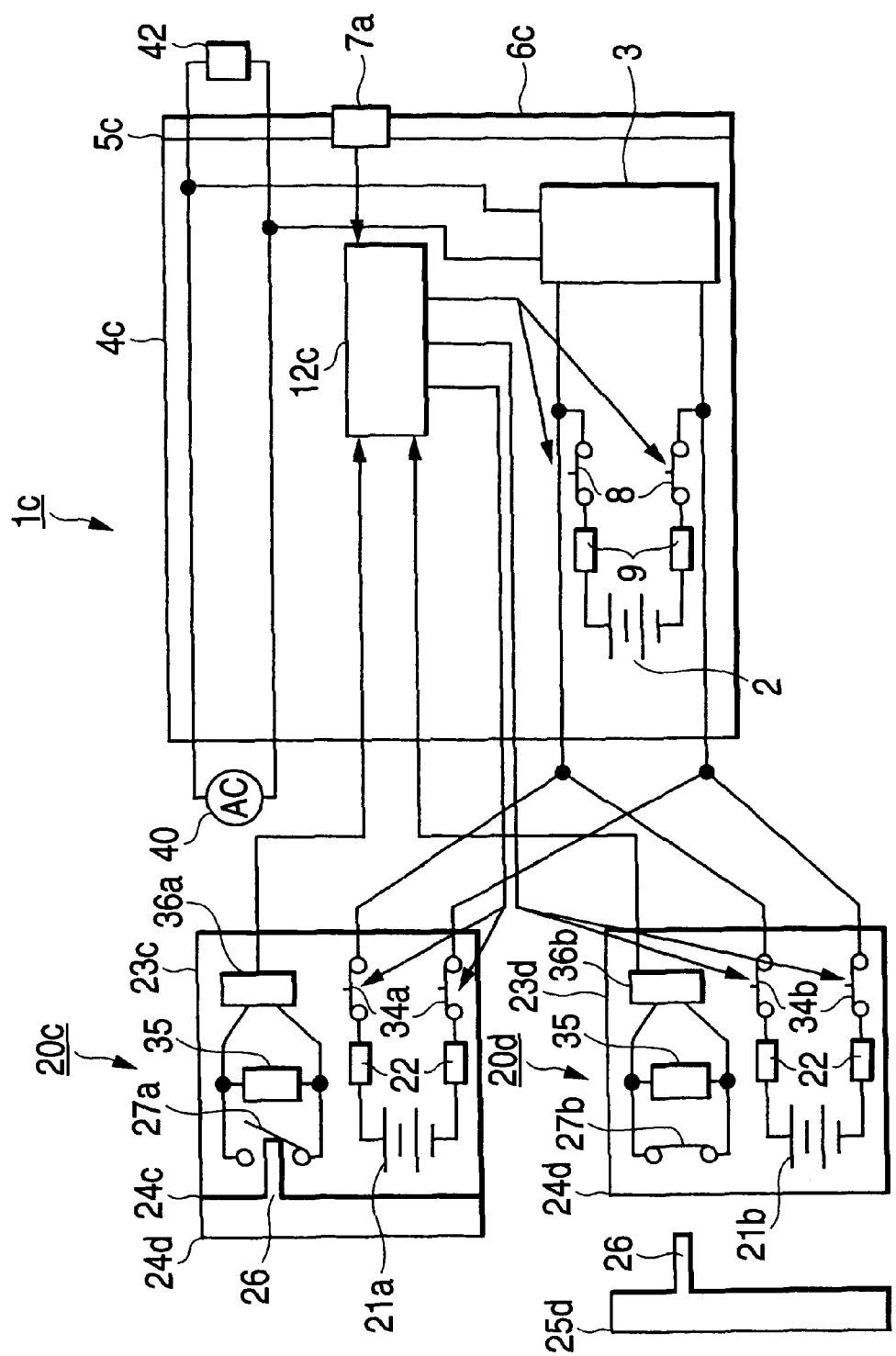
FIG. 3 is a view showing the configuration of an uninterruptible power supply unit of Embodiment 3 of the invention in which a first battery unit and a second battery unit are disposed outside the uninterruptible power supply unit.
Figure 4:
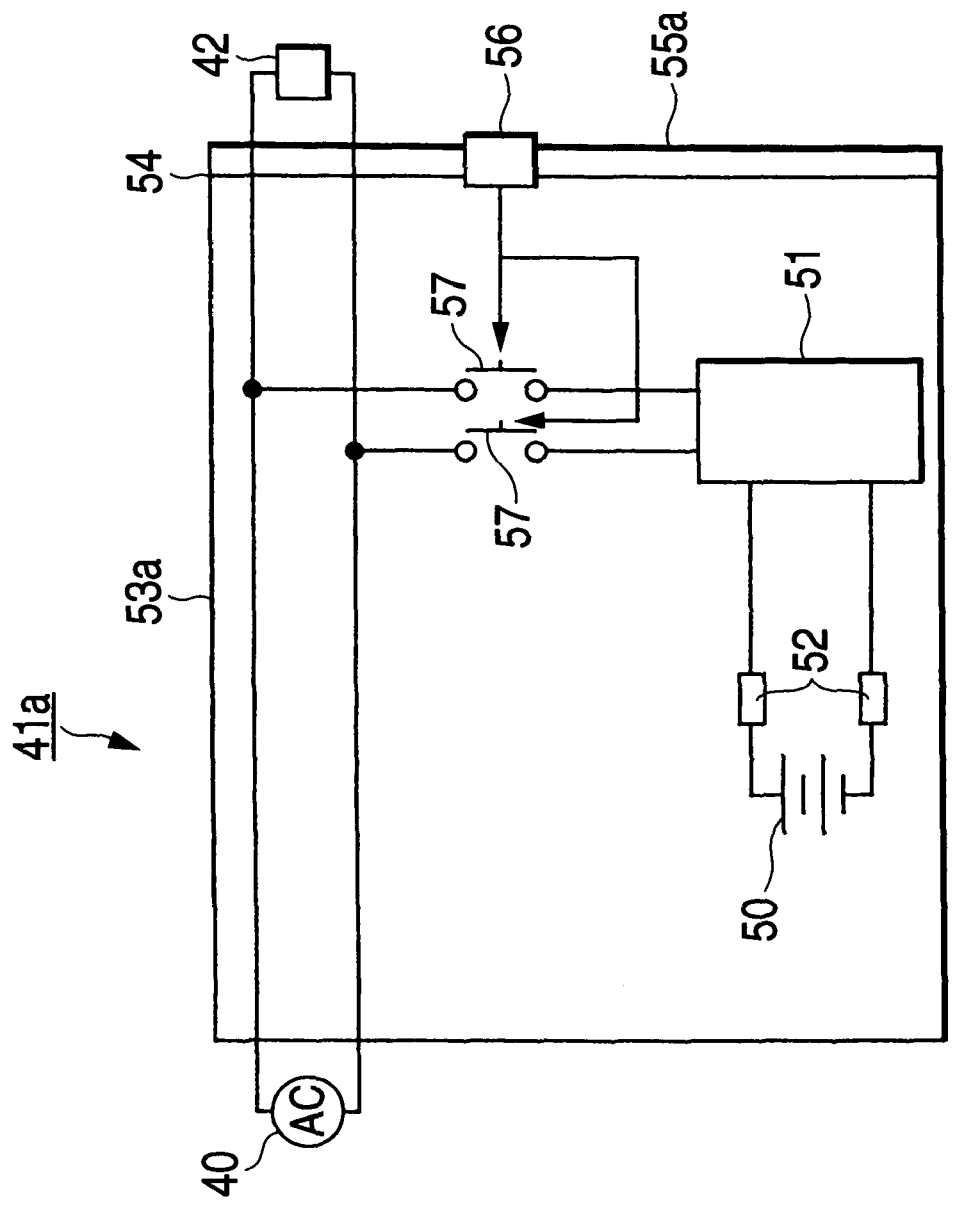
FIG. 4 is a view showing the configuration of a conventional uninterruptible power supply unit.
Figure 5:
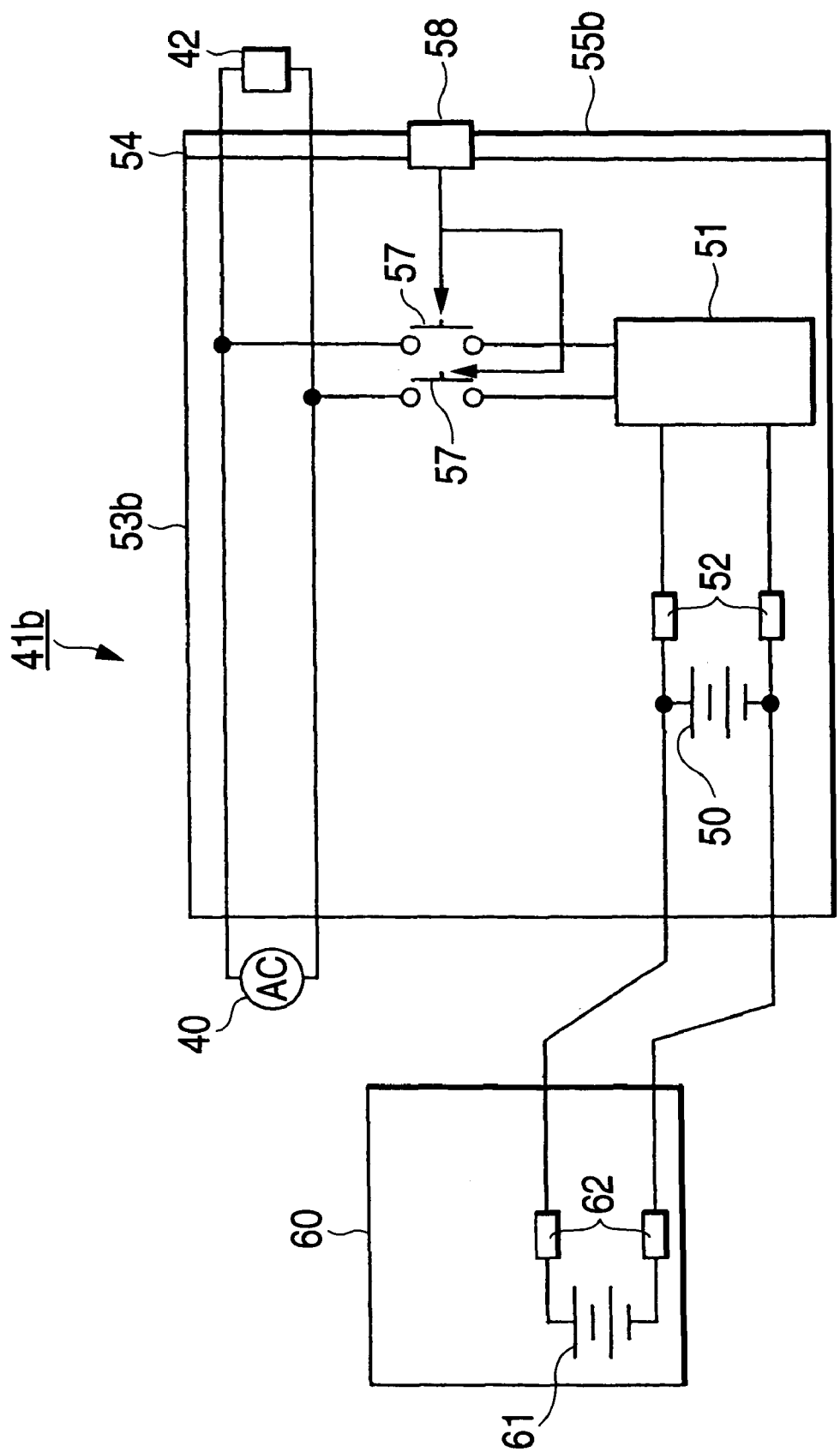
FIG. 5 is a view showing the configuration of a conventional uninterruptible power supply unit in which a battery that is to be separately placed is additionally disposed.

FIG. 3 is a view showing the configuration of an uninterruptible power supply unit of Embodiment 3 of the invention in which a first battery unit and a second battery unit are disposed outside the uninterruptible power supply unit. In the figure, 2, 3, 7a, 22, 26, 40, and 42 denote the identical components as those of FIG. 1, and their description is omitted. Furthermore, 1c denotes the uninterruptible power supply unit, 4c denotes a case of the uninterruptible power supply unit 1c which houses the first battery 2, 5c denotes an opening of the case 4c which is used for replacement of the first battery 2, 6c denotes a first cover for closing the opening 5c, and 12c denotes a control circuit which, in accordance with the opened/closed states of the first cover 5c, and a second cover 25c and a third cover 25d that will be described later, controls opening/closing of a first switch 8 that connects the charge and discharge circuit 3 to the first battery 2, that of a second switch 34a that will be described later, and that connects the charge and discharge circuit 3 to a second battery 21a which will be described later, and that of a third switch 34b that will be described later, and that connects the charge and discharge circuit 3 to a third battery 21b which will be described later.

Furthermore, 20c denotes a first battery unit which is disposed outside the uninterruptible power supply unit 1c, 20d denotes a second battery unit which is disposed outside the uninterruptible power supply unit 1c, 21a denotes the second battery, 21b denotes the third battery, 23c denotes a case which houses the second battery 21a, 23d denotes a case which houses the third battery 21b, 24c denotes an opening of the case 23c which is used for replacement of the second battery 21a, 24d denotes an opening of the case 23d which is used for replacement of the third battery 21b, 25c denotes a second cover for closing the opening 24c, 25d denotes a third protective cover for closing the opening 24d, 27a denotes a second cover open/close switch which is closed or opened by the operation piece 26 when the second cover 25c is opened or closed, 27b denotes a third cover open/close switch which is closed or opened by the operation piece 26 when the third cover 25d is opened or closed, 34a denotes a second switch which connects the charge and discharge circuit 3 to the second battery 21a, 34b denotes a third switch which connects the charge and discharge circuit 3 to the third battery 21b, 35a denotes a second cover opened/closed state detection resistor which is connected in parallel to the second cover open/close switch 27a, 35b denotes a third cover opened/closed state detection resistor which is connected in parallel to the third cover open/close switch 27b, 36a denotes a second cover-opening detecting device which detects an opened/closed state of the second cover 25c, and 36b denotes a third cover-opening detecting device which detects an opened/closed state of the third cover 25d.

In the first battery unit 20c, when the second cover 25c is opened, the operation piece 26 which has caused the second cover open/close switch 27a to be opened is disengaged from the switch to close the second cover open/close switch 27a. The second cover-opening detecting device 36a detects the value of the second cover opened/closed state detection resistor 35a, and, when the second cover open/close switch 27a is closed and a resistance of 0 Ω is detected as a result of formation of a closed circuit of the switch and the second cover opened/closed state detection resistor 35a, judges that the second cover 25c is opened.

In the second battery unit 20d, similarly, when the third cover 25d is opened, the operation piece 26 which has caused the third cover open/close switch 27b to be opened is disengaged from the switch to close the third cover open/close switch 27b. The third cover-opening detecting device 36b detects the value of the third cover opened/closed state detection resistor 35b, and, when the third cover open/close switch 27b is closed and a resistance of 0 Ω is detected as a result of formation of a closed circuit of the switch and the third cover opened/closed state detection resistor 35b, judges that the third cover 25d is opened. FIG. 3 shows an example in which the third cover 25d is opened and the third cover open/close switch 27b is closed.

From information given from the first cover-opening detecting device 7a, the second cover-opening detecting device 36a, and the third cover-opening detecting device 36b, the control circuit 12c judges the opened/closed states of the first cover 6c, the second cover 25c, and the third cover 25d, so as to control opening/closing of the first switch 8 which connects the charge and discharge circuit 3 to the first battery 2, that of the second switch 34a which connects the charge and discharge circuit 3 to the second battery 21a, and that of the third switch 34b which connects the charge and discharge circuit 3 to the third battery 21b.

When the AC power source 40 is normal, the uninterruptible power supply unit 1c supplies an electric power to the backed-up apparatus 42, and closes the first switch 8 which connects the charge and discharge circuit 3 to the first battery 2, the second switch 34a which connects the charge and discharge circuit 3 to the second battery 21a, and the third switch 34b which connects the charge and discharge circuit 3 to the third battery 21b, so that the batteries (the first battery 2, the second battery 21a, and the third battery 21b) are charged by the charge and discharge circuit 3. When the AC power source 40 is in an abnormal state such as power interruption or momentary power interruption, the uninterruptible power supply unit 1c serves as a backup power source to discharge the batteries (the first battery 2, the second battery 21a, and the third battery 21b), thereby supplying an electric power to the backed-up apparatus 42.

During a process of replacing the batteries (the first battery 2, the second battery 21a, and the third battery 21b), when the first cover 6a is opened, the control circuit 12c opens the first switch 8 which connects the charge and discharge circuit 3 to the first battery 2, to enable replacement of the first battery 2. In this case, the second switch 34a which connects the charge and discharge circuit 3 to the second battery 21a, and the third switch 34b which connects the charge and discharge circuit 3 to the third battery 21b are closed, and hence the unit is effective as a backup power source. When the second cover 25c (or the third cover 25d) is opened, similarly, the control circuit 12c opens the second switch 34a which connects the charge and discharge circuit 3 to the second battery 21a (or the third switch 34b which connects the charge and discharge circuit 3 to the third battery 21b), to enable replacement of the second battery 21a (or the third battery 21b) In this case, the first switch 8 which connects the charge and discharge circuit 3 to the first battery 2, and the third switch 34b which connects the charge and discharge circuit 3 to the third battery 21b (or the first switch 8 which connects the charge and discharge circuit 3 to the first battery 2, and the second switch 34a which connects the charge and discharge circuit 3 to the second battery 21a) are closed, and hence the unit is effective as a backup power source.

In Embodiment 1, the example has been shown in which the uninterruptible power supply unit 1a comprises: the second cover opened/closed state detection resistor 28 which is connected in parallel to the second cover open/close switch 27a; and the second cover-opening detecting device 11a which detects the value of the second cover opened/closed state detection resistor 28 to judge whether the second cover 25a is opened or not. By contrast, in Embodiment 3, the battery unit 20c (or the battery unit 20d) comprises: the second cover opened/closed state detection resistor 35a (or the third cover opened/closed state detection resistor 35b) which is connected in parallel to the second cover open/close switch 27a (or the third cover open/close switch 27b); and the second cover-opening detecting device 36a (or the third cover-opening detecting device 36b) which detects the value of the second cover opened/closed state detection resistor 35a (or the third cover opened/closed state detection resistor 35b) to judge whether the second cover 25c (or the third cover 35d) is opened or not.

In Embodiment 3, the cover-opening detecting device is disposed in the battery unit which is disposed outside the uninterruptible power supply unit, a result of the cover opening detection is transmitted to the uninterruptible power supply unit, and opening/closing of the switch which connects the charge and discharge circuit to the battery is controlled. Even when a plurality of battery units are connected, therefore, battery replacement can be performed independently for each of the battery units.

In Embodiment 3 described above, the example in which two battery units, i.e., the first battery unit 20c and the second battery unit 20d are connected to the uninterruptible power supply unit 1c has been shown. Alternatively, the first battery unit 20c may be usually connected, and, when the battery is to be replaced, the second battery unit 20d may be additionally connected in order to ensure the backup time during a process of replacing the battery.

Industrial Applicability

As described above, the uninterruptible power supply unit of the invention is suitably used a backup power source for an apparatus such as a computer which always requires a stabilized electric power even during a process of replacing a battery.

What is claimed is:

1. An uninterruptible power supply unit which has a battery and a charge and discharge circuit, and in which, when an AC power source is in a normal state, the AC power source is used as a power source to supply an electric power to a backed-up apparatus, and said battery is charged by said charge and discharge circuit, and, when the AC power source is in an abnormal state such as power interruption, said battery is discharged by said charge and discharge circuit to supply an electric power to the backed-up apparatus, characterized in that said battery is configured by a first battery and a second battery, said unit comprises:
a first switch which connects said charge and discharge circuit to said first battery;
a second switch which connects said charge and discharge circuit to said second battery;
a first cover which is opened when said first battery is to be replaced;
a second cover which is opened when said second battery is to be replaced;
a first cover-opening detecting device which detects an opened state of said first cover;
a second cover-opening detecting device which detects an opened state of said second cover; and
a control circuit which controls opening/closing of said first switch and said second switch in accordance with opened/closed states of said first cover and said second cover;
wherein when said first cover is opened, said first switch is opened to enable replacement of said first battery, and, when said second cover is opened, said second switch is opened to enable replacement of said second battery.

2. An uninterruptible power supply unit according to claim 1, characterized in that said second battery, said second cover, said second cover-opening detecting device, and said second switch constitute a battery unit which can be disposed separately from said uninterruptible power supply unit.

3. An uninterruptible power supply unit according to claim 1 or 2, characterized in that said unit has at least one of a display device and an alarm device, and, when said first cover or said second cover is opened, said control circuit gives an alarm for an opened state of said cover.

4. An uninterruptible power supply unit according to any one of claims 1 to 3, characterized in that said first cover or said second cover comprises interlocking means, and said control circuit interlocks said second cover when said first cover is opened, and interlocks said first cover when said second cover is opened.

* * * * *